March 24, 1942.    B. S. AIKMAN    2,277,052
BRAKE APPARATUS
Filed Sept. 21, 1940
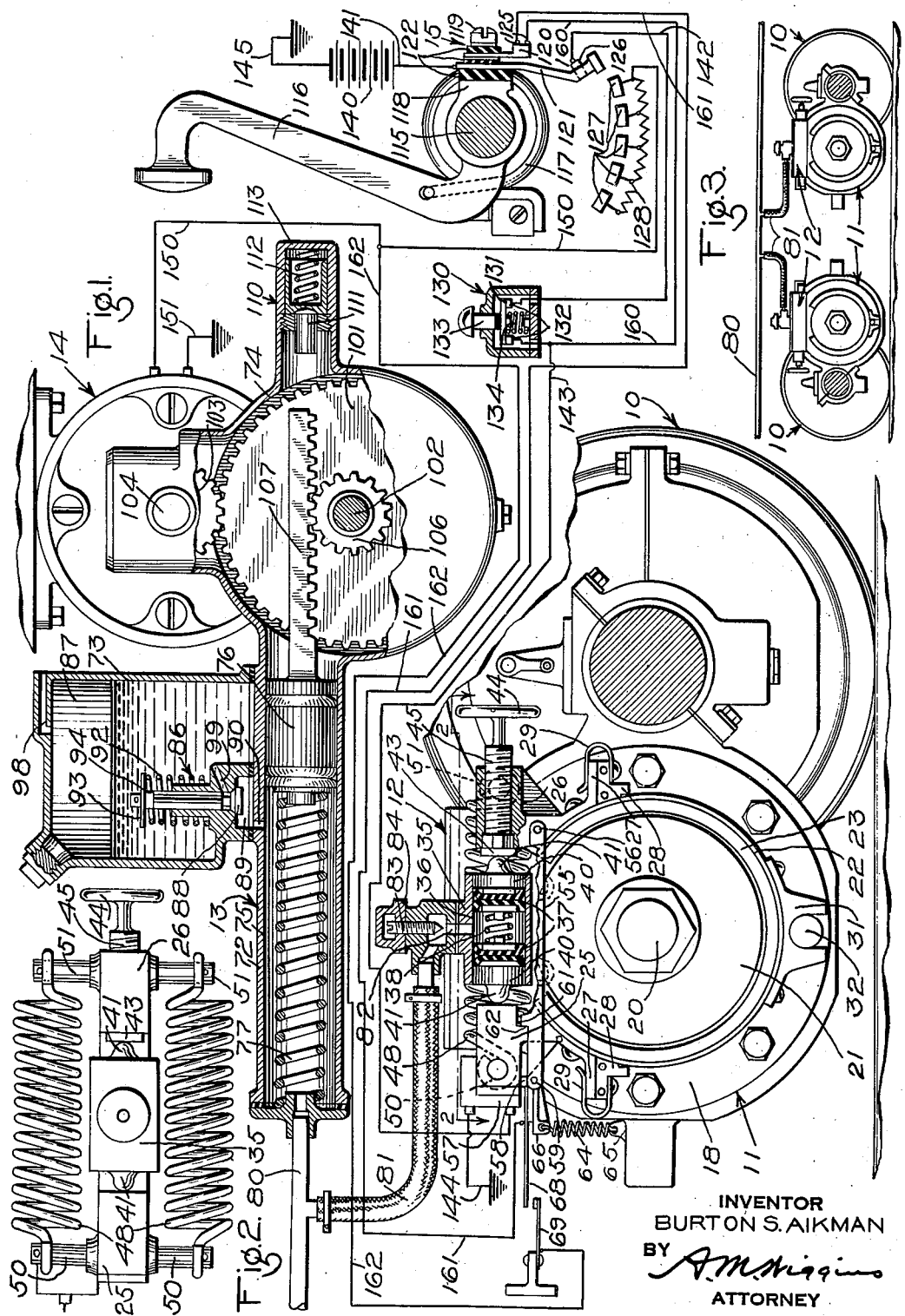
INVENTOR
BURTON S. AIKMAN
BY
ATTORNEY Patented Mar. 24, 1942

2,277,052

UNITED STATES PATENT OFFICE 2,277,052

BRAKE APPARATUS

Burton S. Aikman, Wilkinsburg, Pa., assignor to The Westinghouse Air Brake Company, Wilmerding, Pa., a corporation of Pennsylvania Application September 21, 1940, Serial No. 357,736

10 Claims. (Cl. 188—170)

This invention relates to vehicle brake systems, and particularly to a brake equipment of the class in which the braking power is produced by springs.

In order to minimize cost of maintenance and operation of vehicles employed in certain classes of railway service, such as street railway or subway service, it has been proposed to provide spring actuated brake devices for each wheel and axle assembly of a vehicle, including in each case a torque motor device for effecting release of the brakes, together with controller means for governing all of the separate torque motors simultaneously.

It is the principal object of my invention to provide an improved spring actuated brake equipment for such a vehicle, including separate spring brake devices for the individual wheel and axle assemblies, hydraulic means for controlling the application and release of all of the spring brake devices simultaneously, and motor driven means for controlling the pressure of fluid in the hydraulic means in accordance with the operation of a motorman's foot pedal or the like.

Another object of the invention is to provide a vehicle braking equipment comprising a plurality of relatively inexpensive spring actuated brake devices, each of which is arranged to apply braking force to a driving motor shaft or other rotating portion of each wheel and axle assembly, fluid pressure control means operatively connected with all of the individual spring actuated brake devices, and a single motor powered pressure controlling assembly, which may be conveniently mounted in any desired position on the vehicle and is adapted to effect joint control of the separate spring brake devices through the medium of the fluid pressure control means.

Other objects and advantages of this invention will appear in the following detailed description thereof, taken in conjunction with the accompanying drawing, in which Fig. 1 is a schematic elevational view, mainly in section, of a vehicle brake equipment constructed in accordance with my invention;

Fig. 2 is a fragmentary sectional view taken along the line 2—2 of Fig. 1; and

Fig. 3 is an elevational view illustrating the same equipment as applied to a plurality of truck axles.

Referring to Fig. 1 of the drawing, the apparatus illustrated includes a wheel and axle assembly 10, which may be one of a plurality of similar wheel and axle assemblies of a railway vehicle, not shown, a driving motor 11, a spring brake mechanism 12 associated therewith, a fluid pressure device 13, a torque motor assembly 14 associated therewith, and an operator's controller device 15.

The driving motor 11 comprises a casing structure 18, which may be supported partly by the axle of the wheel and axle assembly and by the usual truck frame, not shown, and a rotor having a shaft 20 extending outwardly of the casing structure. Secured to the shaft 20 and rotatable therewith is a brake drum 21, around which is disposed a flexible brake band 22 carrying suitable lining material 23. The upper ends of the brake band 22 are spaced apart and are respectively riveted or otherwise secured to movable members 25 and 26, each of which is provided with a lug portion 27 disposed in supporting relation with one of a pair of bracket elements 28 carried by the casing structure 18 on opposite sides of the brake band. Spring clips 29 may be provided for yieldingly holding the two lug portions 27 in engagement with the bracket members 28. A clevis member 31 is riveted or otherwise secured to the lower portion of the brake band 22 and is arranged to receive a stationary stud 32 carried by the motor casing structure 18, which stud functions together with the two lug members 28 to support the brake band and associated elements without interfering with free movement thereof during operation as hereinafter explained.

Interposed between the movable members 25 and 26 is a cylinder member 35, which may be bolted or otherwise suitably secured to the casing structure 18 and has a bore 36 having slidably mounted therein a pair of pistons 37. The pistons 37 are spaced apart by means of a coil spring 38, which functions to maintain each of the pistons in engagement with one of a pair of follower elements 40, which are operatively mounted in the bore 36 and are adapted to be moved in opposite directions by the respective pistons upon the supply of fluid under pressure to the bore as hereinafter explained. A rounded extension 41 is formed on each of the follower elements 40, the extension adjacent the movable member 25 being adapted to engage the end surface thereof, and the extension 41 adjacent the other movable member 26 being arranged for engagement with a plunger 43, which is carried in a suitable bore formed in the member 26. The plunger 43 may be adjusted in position with respect to the movable member 26 by manual operation of a hand wheel 44 carried by a shaft 45 which has screw-threaded connection with the member 26.

The brake band 22 is arranged to be pulled into braking relation with the drum 21 upon operation of the two movable members 25 and 26 under the force exerted by a pair of brake springs 48, which are disposed at opposite sides of the respective movable members 25 and 26, as may be seen in Fig. 2. Each of the springs 48 has one end secured to one of a pair of trunnions 50 carried by the member 25, and has the opposite end connected to a trunnion 51 projecting from the member 26, so that the two springs are thus arranged to exert inwardly directed forces on the members 25 and 26 tending to draw the associated brake band into braking engagement with the drum during an application of the brakes, as hereinafter described.

Also associated with the spring brake mechanism 12 is an electrically operated latch device for normally holding the elements just described in release position, comprising a longitudinally disposed latch bar 55 having one end pivotally connected by means of a pin 56 to the member 26, and an electromagnet 57 having an operating element 58 that is pivotally connected by means of a pin 59 to the end of the latch bar extending below the movable member 25. The latch bar 55 is provided with a shoulder 61 which is adapted to engage a lug 62 formed on the movable member 25 when the spring brake mechanism is in release position and the magnet 57 is energized, as hereinafter more fully explained. A tension spring 64 is provided for urging the latch bar 55 downwardly and out of engagement with the latch bar, this spring being connected to a lug 65 carried by the casing structure of the motor 11 and to an extension 66 formed on the latch bar. A suitably insulated switch contact element 68 is mounted on the end of the latch bar 55 and is adapted to be moved into contact with a stationary switch contact element 69 when the latch bar is moved downwardly under the force of the spring 64, for a purpose hereinafter described.

The fluid pressure device 13 is provided with a casing structure including a cylinder section 72, a reservoir section 73, and a gear housing section 74, all of which may be suitably bolted or otherwise secured together and mounted in any desired position on the vehicle. The cylinder section 72 has formed therein a bore 75 in which is slidably mounted a piston 76 which is normally urged toward an inactive position, as shown in the drawing, by the force of a coil spring 77 interposed between the piston and the end wall of the bore 75. The bore 75 communicates with a control pipe 80, which is in turn connected to each of the spring brake mechanisms with which the vehicle is equipped by way of suitable flexible conduits, such as the conduit 81 communicating with a passage 82 leading to the bore 36 of the mechanism 12. An adjustable valve element 83 is preferably mounted in the casing structure 35 to enable control of the rate of flow of fluid through the passage 82 at any desired rate or to permit the individual brake mechanism to be cut out of operation for repairs. A locking cap 84 is secured to the outer end of the valve element 83 under normal conditions.

In order to maintain the necessary volume of liquid in the bore 75 and associated control pipe and conduit, a feed valve assembly 86 is mounted within a chamber 87 formed in the reservoir section 73 of the casing structure, which assembly comprises a valve 88 disposed in a valve chamber 89 communicating through a port 90 with the bore 75, and a coil spring 92 that acts through the medium of a collar 93 and valve stem 94 for normally holding the valve on its seat. The reservoir chamber 87 is adapted to contain a supply of oil or other suitable liquid, which is subject at all times to atmospheric pressure, it being observed that the casing section 73 is provided with an atmospheric vent 98. The valve 88 is thus arranged to permit the supply of liquid from the chamber 87 through a passage 99, the chamber 89 and port 90 to the bore 75 to replace liquid lost due to leakage or other cause, it being evident that when liquid is lost from the control system, the movement of the piston 76 to its normal position as shown in Fig. 1 will create a partial vacuum in the bore 75, thereby causing liquid to be drawn from the reservoir chamber 87.

The piston 76 is constructed and arranged to be operated by the torque motor device 14 through the medium of a gear assembly mounted within the casing section 74, which assembly comprises a gear 101 keyed or otherwise secured to a rotary shaft 102 and intermeshed with a pinion 103 which is in turn keyed to the armature shaft 104 of the torque motor device. Also secured to the shaft 102 for rotation with the gear 101 is a pinion 106, the teeth of which are intermeshed with suitable teeth formed on a rack member 107, one end of which is connected to the piston 76.

The torque motor device 14 is of the type operative when energized to deliver driving torque which is substantially directly proportional to the degree of energization thereof, the windings of the motor being designed to resist burning out regardless of the load. According to the invention, the torque motor device 14 is arranged to exert a driving force on the gear 101, when the motor is energized, tending to rotate the gear and pinion 106 in a counterclockwise direction and consequently exerting a force on the rack member 107 tending to push the piston 76 toward the left hand as viewed in the drawing.

A shock absorbing device 110 is associated with the gear assembly for preventing undue strain on the operating elements of the equipment in the event of overtravel of the rack member 107 to the right. This device comprises a movable abutment 111 that is operatively aligned with the end of the rack member, and a coil spring 112 interposed between the abutment and end wall 113 of the portion of the casing structure containing the shock absorbing device.

The motorman's brake controller device 15 comprises a suitable casing structure, not illustrated in detail, in which is rotatably mounted a shaft 115 having secured thereto a foot pedal 116, which is biased toward release position under the force exerted by a coil spring 117 mounted within the casing of the device. Secured to an extension 118 of the foot pedal by suitable means, such as a bolt 119, are a switch contact element 120 and a rheostat contact arm 121. Suitable insulating members 122 are interposed between the extension 118 and the two contact elements 120 and 121. The contact element 120 is operative to bridge a pair of contact elements 125 when the foot pedal 116 is in release position as shown in the drawing. In this position of the foot pedal the rheostat arm 121 is held in contact with a contact element 126. The arm 121 is constructed and arranged for movement away from that element and into contact with each of a plurality of rheostat points 127 in succession for connecting portions of a resistance means 128 into the braking circuit upon movement of the pedal 116 to effect an application of the brakes.

Associated with the motorman's controller device 15 is a safety control switch device 130, comprising a casing structure having mounted therein a switch contact element 131 which is controlled by a button 133 and is operative to bridge a pair of contact elements 132 so long as the operator holds the button in its lowermost position against the force of a coil spring 134. The safety control switch device 130 is preferably located in a convenient position adjacent the foot pedal 116.

*Operation*

In Fig. 1 of the drawing the brake equipment is illustrated in release position and in condition for operation, with the bore 75 of the fluid pressure device 13, control pipe 80, conduit 81 and bore 36 of the spring brake mechanism filled with liquid. It will be observed that the motorman's controller device 15 is at this time in release position and that the safety switch device 130 is held in circuit closing position, while the various elements of the spring brake mechanism also are maintained in release position against the combined forces of the springs 48, due to engagement of the lug 61 of the latch bar 55 with the lug 62 formed on the member 25.

The latch bar 55 is thus positioned in its upper or engaged position by reason of energization of the magnet 57 through a circuit which includes the positive terminal of a battery 140, a conductor 141, the rheostat arm 121 carried by the controller pedal, the contact element 126, a conductor 142, the connected contact members 132 and 131 of the switch device 130, a conductor 143, the coil of magnet 57, a grounded conductor 144, and a grounded conductor 145 leading to the negative terminal of the battery. The torque motor device 14 is not supplied with current while the brake pedal 116 remains in release position and the latch member 55 functions to maintain the spring brake mechanism 12 in release position, so that the piston 76 is not subjected to a force opposing that of the spring 77, and the liquid contained in the bore 75, control pipe 80 and associated communications is consequently held under atmospheric pressure only.

When it is desired to effect an application of the brakes under normal conditions, the brake pedal 116 is operated to rotate about the shaft 115 in a clockwise direction, until the rheostat arm 121, while still engaging the elongated contact element 126, is brought into contact with the first of the contact elements 127. A circuit is thereby established for effecting supply of maximum current to the torque motor device 14, which circuit includes the positive terminal of the battery 140, the conductor 141, rheostat arm 121, the first contact element 127, a conductor 150, the windings of the torque motor, a grounded conductor 151 and the grounded conductor 145 connected to the battery. It will be noted that the resistance 128 of the controller device 15 is not at this time included in the circuit for energizing the torque motor device.

With the torque motor device 14 thus energized to a maximum degree it is rendered operative through the medium of the pinion 103, gear 101, pinion 106 and rack member 107 to force the piston 76 into the bore 75 and against the opposing force of the spring 77. The piston 76 is thereby operated to effect an increase in the pressure of liquid contained in the bore 75 of the fluid pressure device 13, control pipe 80, and the various conduits and brake devices associated therewith including the conduit 81 and bore 36 of the spring brake device 12. Thus, as a result of the full energization of the motor device 14, the pressure of liquid in the bore 36 is at this time increased to a maximum value, and the pistons 37 and follower members 40 are forced in opposite directions against the respective movable members 25 and 26 associated with the brake band 22, while the lug 61 of the latch member 55 is partially relieved of force previously exerted by the springs 48 through the medium of the member 25 as already explained. It will thus be seen that the initial operation of the motorman's control pedal 116 is effective to render the torque motor device 14 operative to maintain each of the spring brake devices, such as the device 12, in full release position.

Continued movement of the pedal 116 of the motorman's controller device 15 then effects disengagement of the rheostat arm 121 from the contact element 126 while the rheostat arm is brought into contact with another of the contact elements 127. Upon disengagement of the rheostat arm from the contact member 126 the supply of energizing current to the magnet 57 of the spring brake mechanism 12 is cut off, whereupon the latch bar 55 is pulled downwardly and away from the movable member 25 by the force of the coil spring 64. At the same time, since the rheostat arm 121 has been moved far enough to cut a portion of the resistance 128 into the circuit for energizing the torque motor device 14, the force with which that device acts through the medium of the associated gears to urge the piston 76 to the left is somewhat reduced, so that the hydraulic pressure maintained by the piston within the bore 75, control pipe 80 and bore 36 of the spring brake device is consequently lessened to a corresponding degree.

Upon the reduction in the pressure of liquid in the bore 36, the pair of brake springs 48 are rendered operative to draw inwardly the movable members 25 and 26, the pistons 37 and follower members 40 being at the same time forced closer together in the bore. This movement of the two movable members 25 and 26 effects constriction of the brake band 22 so as to force the lining 23 thereof into braking engagement with the rotating drum 21, through the medium of which the retarding force is of course applied to the wheel and axle assembly 10.

It will be apparent that if the pedal 116 of the motorman's controller device 15 is further operated to cause a greater portion of the resistance 128 to be included in the circuit for the torque motor device 14, the torque output thereof and consequently the pressure of liquid in the control pipe 80 will be correspondingly further reduced, with the result that the brake springs 48 will be permitted to effect application of a still heavier braking force to the wheel and axle with which the spring brake mechanism is associated. It will be understood, of course, that each increase in the degree of application of the brakes is effected simultaneously by all of the spring brake devices with which the vehicle is equipped, since the control pipe 80 and the associated hydraulic pressure apparatus are common to the separate elements of the vehicle brake equipment.

In order to effect the release of the brakes, the pedal 116 is permitted to return to release position, as shown in Fig. 1, under the force exerted by the coil spring 117, the rheostat arm 121 being thereby moved into and out of contact with the several contact elements 127 in succession until the resistance 128 is again cut out of the torque motor circuit. As the current supplied for energizing the torque motor device 14 is thus increased to the maximum value, the torque motor device again becomes operative to cause movement of the piston 76 into the bore 75 for increasing the pressure of liquid therein and in the control pipe 80, the consequent increase in fluid pressure acting on the pistons 37 of the spring brake device 12 causing return movement of the various elements of the device to release position as already explained. The movable members 25 and 26 are thus shifted outwardly to their extreme release positions by the time the rheostat arm 121 of the motorman's controller device is brought into contact with the contact element 126 for closing the circuit of the magnet 57, which when thus energized picks up the latch bar 55. With the latch bar 55 again held in the position in which it is shown in Fig. 1, the spring brake mechanism 12 is locked in release position, so that when the rheostat arm 121 of the motorman's controller device is finally withdrawn from contact with the first of the contact elements 127 for cutting off all flow of energizing current to the torque motor device 14, the brakes on the vehicle wheels nevertheless remain in the desired condition.

Although the magnet 57 is constructed and arranged to exert a positive force on the latch bar 55 tending to hold that member in latching position under all normal conditions while the brakes are released, means has been provided to prevent undesired operation of the spring brake mechanism 12 to effect an application of the brakes in case the latch bar should accidently be displaced downwardly and out of interlocking engagement with the movable member 25 while the pedal 116 of the motorman's controller device remains in release position. Should the latch bar 55 be accidently dislodged from engagement with the member 25 of the spring brake mechanism, the latch bar in moving downwardly carries with it the spring contact element 68, which is thus brought into contact with the stationary contact element 69, thereby closing an auxiliary circuit for energizing the torque motor device 14. This auxiliary circuit includes the positive terminal of the battery 140, conductor 141, the rheostat arm 121, contact element 126, conductor 142, the contact elements of the safety switch device 130, a conductor 160, the contacts 125 which are bridged by the member 120, a conductor 161, the connected contact elements 68 and 69, a conductor 162, the conductor 150 leading to the motor windings, the grounded conductor 151, and the grounded battery conductor 145. Upon energization of the torque motor device 14, the elements of the fluid pressure device 13 are actuated in the manner already explained to create hydraulic pressure for insuring continued release of the brakes.

If the motorman should release the plunger 133 of the safety control switch device 130, the spring 134 will become effective to lift the contact 131 out of contact with the elements 132, thereby deenergizing the magnet 57. The latch bar 55 will in that case be disengaged from the movable member 25 and be pulled downwardly by the spring 64, and the brake springs 48 will thus be rendered operative to effect application of the brakes. It will be noted that although the contact element 68 is again brought into engagement with the contact element 69 upon downward movement of latch bar, the torque motor device 14 will not be energized at this time, by reason of the fact the now open safety switch device 130 is interposed in the auxiliary torque motor circuit hereinbefore traced. It will be understood that the circuits controlled by the safety switch device 130 and connected to the magnet 57 and switch contact elements 68 and 69 associated with the brake mechanism 12, are in actual practice extended to include the corresponding elements associated with other brake mechanisms carried by the vehicle, although to simplify the drawing the complete circuits are not shown in detail.

To summarize briefly, the automatic brake equipment constructed in accordance with my invention is particularly well suited for use on a vehicle of the class that may be equipped with spring brakes to advantage, and comprises an individual spring brake mechanism for each wheel and axle assembly, fluid pressure responsive means for effecting the release of the brake means, and a master control apparatus for all the brakes on the vehicle including means for establishing a control fluid pressure and a torque motor device operative to control said means in accordance with operation of a motorman's controller device. It will thus be seen that a plurality of separate spring brake mechanisms embody the hydraulic release feature of the invention may be controlled simultaneously and uniformly in accordance with the operation of a single controller device.

Although a preferred embodiment of the invention has been described in detail, it is not intended to limit the scope thereof to that embodiment or otherwise than by the terms of the appended claims.

Having now described my invention, what I claim as new and desire to secure by Letters Patent, is:

1. A vehicle brake equipment comprising spring actuated braking means, apparatus for releasing said spring braking means including a torque motor and means for transmitting a force corresponding to the static torque of said motor to said spring actuated braking means, an electroresponsive latch device operative when energized to maintain said spring actuated braking means in release position, controller means having a release position for energizing said electroresponsive latch device while said torque motor is deenergized, and switch means constructed and arranged to close a circuit for energizing said torque motor in the event of failure of said latch device while said controller is disposed in release position.

2. A vehicle brake equipment comprising spring means, brake means adapted to be applied under the force exerted by said spring means, release means operative to effect release of said brake means, means for operating said release means including an electric motor designed to produce a static torque proportional to the degree of energization thereof, controller means operable to govern the energization of said electric motor, and latch means operative in one position to maintain the brake means in release position against the force exerted by said spring means, and operative in another position to cause energization of said electric motor.

3. A vehicle brake equipment comprising spring actuated brake means, release apparatus for effecting release of said spring actuated brake means including an electric motor operative to produce a static torque proportional to the degree of energization thereof, an electroresponsive latch device operative in one position to hold said spring actuated brake means in release position and operative in another position to cause energization of said electric motor, and a controller device operative when moved through a brake application zone to render said latch device inoperative while varying the degree of energization of said electric motor.

4. Brake control apparatus for a brake assembly of the type involving brake means and spring means arranged to apply said brake means, said control apparatus comprising an electric motor operative to produce a static torque proportional to the degree of energization thereof, hydrostatic means operative by said motor for effecting release of said brake means, controller means operative to energize and deenergize said motor, and electroresponsive holding means cooperative with said controller means for maintaining said brake means in release position when said motor is rendered inoperative.

5. Brake control apparatus for a brake assembly of the type involving brake means and spring means arranged to apply said brake means, said control apparatus comprising an electric motor operative to produce a static torque proportional to the degree of energization thereof, means operative by said motor for effecting release of said brake means, controller means operable to energize and deenergize said motor, a safety device having an operative position and an inoperative position, and electroresponsive holding means cooperative with said controller means and said safety device for maintaining said brake means in release position when said motor is rendered inoperative, said safety device being constructed and arranged to render said holding means ineffective unless it is forcibly held in said operative position.

6. Brake control apparatus for a brake assembly of a type involving brake means and spring means arranged to apply said brake means, said control apparatus comprising an electric motor operative to produce a static torque proportional to the degree of energization thereof, means operative by said motor for effecting release of said brake means, controller means operable to energize and deenergize said motor, electroresponsive holding means interposed in a circuit controlled by said controller means for maintaining said brake means in release position when said motor is rendered inoperative, and a safety switch device also interposed in said circuit and biased toward a circuit opening position.

7. A vehicle brake equipment comprising spring applied brake means, fluid pressure responsive release means for effecting release of said brake means, fluid pressure controlling means including a cylinder and a piston operable to vary the pressure of fluid acting on said release means, an electric motor operatively connected to said piston and adapted to produce a static torque proportional to the degree of energization thereof, an electroresponsive latch device operative when energized to hold said spring applied brake means in release position and normally operative when deenergized to cause maximum energization of said electric motor, and a controller device movable through a brake application zone to vary the degree of energization of said electric motor and to render said latch device inoperative to affect either the brake means or the motor.

8. A vehicle brake equipment comprising a plurality of spring actuated brake mechanisms, a plurality of fluid pressure responsive devices for effecting release of said spring actuated brake mechanisms, hydrostatic means operable to establish hydraulic pressure in all of said fluid pressure responsive devices simultaneously, control means cooperative with said hydrostatic means including an electric motor operative to produce a static torque proportional to the degree of energization thereof, an electroresponsive latch device operative in one position to hold said spring actuated brake means in release position and operative in another position to cause energization of said electric motor, and a controller device operative when moved through a brake application zone to render said latch device inoperative while varying the degree of energization of said electric motor.

9. A brake equipment for vehicles having a plurality of wheel and axle assemblies, comprising a plurality of spring actuated brake mechanisms associated with said wheel and axle assemblies respectively, fluid pressure responsive means for effecting release of each of said spring actuated brake mechanisms, a control pipe communicating with all of said fluid pressure responsive means, hydraulic pressure control means including a cylinder communicating with said control pipe and a movable abutment operably mounted in said cylinder, an electric motor operative to produce a static torque proportional to the degree of energization thereof, said motor being operative to move said abutment to different positions for establishing any desired hydraulic pressure in said cylinder, controller means operative to energize and deenergize said motor, and electroresponsive holding means cooperative with said controller means for normally maintaining said brake means in release position when said motor is deenergized.

10. A vehicle brake equipment comprising spring actuated brake means, hydraulic pressure responsive means for effecting release of said brake means, hydraulic pressure control means including a cylinder communicating with said pressure responsive means and a movable abutment operably mounted therein, a torque motor device operative to move said abutment to different positions for establishing any desired hydraulic pressure, controller means operative to energize and deenergize said motor, and electroresponsive holding means cooperative with said controller means for maintaining said brake means in release position when said motor is deenergized.

BURTON S. AIKMAN.